United States Patent [19]
Dent et al.

[11] 3,929,007
[45] Dec. 30, 1975

[54] APPARATUS FOR CARRYING OUT ULTRASONIC INSPECTION OF PRESSURE VESSELS

[75] Inventors: Kenneth Henry Dent, Northwich; Ronald Scott Challender, Warrington, both of England

[73] Assignee: United Kingdom Atomic Energy Authority, London, England

[22] Filed: Dec. 13, 1973

[21] Appl. No.: 424,577

[52] U.S. Cl............................ 73/67.8 S; 73/71.5 US
[51] Int. Cl.².................................... G01N 29/04
[58] Field of Search............ 73/67.7, 67.8 R, 67.8 S, 73/67.9, 71.5 US; 33/148 E, 149 R, 153 B

[56] References Cited
UNITED STATES PATENTS

| | | | |
|---|---|---|---|
| 3,081,548 | 3/1963 | Schwartz | 33/149 R |
| 3,670,562 | 6/1972 | Muto et al. | 73/67.8 R |
| 3,741,003 | 6/1973 | Gunkel | 73/71.5 US |
| 3,809,607 | 5/1974 | Murray et al. | 73/67.8 S |

FOREIGN PATENTS OR APPLICATIONS

| 105,488 | 4/1917 | United Kingdom | 33/148 E |
|---|---|---|---|

Primary Examiner—Richard C. Queisser
Assistant Examiner—John P. Beauchamp
Attorney, Agent, or Firm—Larson, Taylor and Hinds

[57] ABSTRACT

A carriage-supported manipulator for taking an ultrasonic scanner mechanism into a coolant nozzle of a nuclear reactor pressure vessel. The manipulator is rotatable about the axis of the nozzle and is radially expansible to urge the scanner mechanism into a scanning position within the nozzle.

3 Claims, 3 Drawing Figures

APPARATUS FOR CARRYING OUT ULTRASONIC INSPECTION OF PRESSURE VESSELS

BACKGROUND OF THE INVENTION

This invention relates to apparatus for carrying out ultrasonic inspection of pressure vessels and especially for inspection of inlet and outlet coolant nozzles of nuclear reactor pressure vessels.

SUMMARY OF THE INVENTION

According to the invention a manipulator for operably supporting an ultrasonic scanner mechanism within a coolant nozzle of a nuclear reactor pressure vessel comprises a pair of legs pivoted in caliper form, the pair of legs being adapted for support by a carriage of inspection apparatus and the pair of legs being rotatable about its principle axis, means for pivotting the legs together to enable free entry of the manipulator and ultrasonic scanner mechanism into the nozzle and for pivotting the legs apart to bring the ultrasonic scanner mechanism into an operable position adjacent the wall of the nozzle.

The invention provides a carriage-supported manipulator for taking an ultrasonic scanner mechanism into the inlet or outlet nozzle of a reactor pressure vessel, the carriage having means for rotating the manipulator whilst in the nozzle to enable an ultrasonic transmit/receive head in the scanner mechanism to scan the interior surface of the nozzle.

The manipulator is characterised in that it is provided with a radially contractable and expansible device to allow the manipulator to be easily inserted in the nozzle when contracted and to permit the manipulator to span the internal dimensions of the nozzle when expanded and thereby cause the scanning mechanism to press against the nozzle without passing back significant reaction forces to the means for rotating the manipulator or the manipulator carriage.

DESCRIPTION OF THE DRAWINGS

A construction of appratus for carrying out ultrasonic inspection of a nuclear reactor pressure vessel and including a manipulator according to the invention will now be described, by way of example, with reference to the accompanying drawings wherein.

DESCRIPTION OF THE PREFERRED EMBODIMENT

Figure 1:
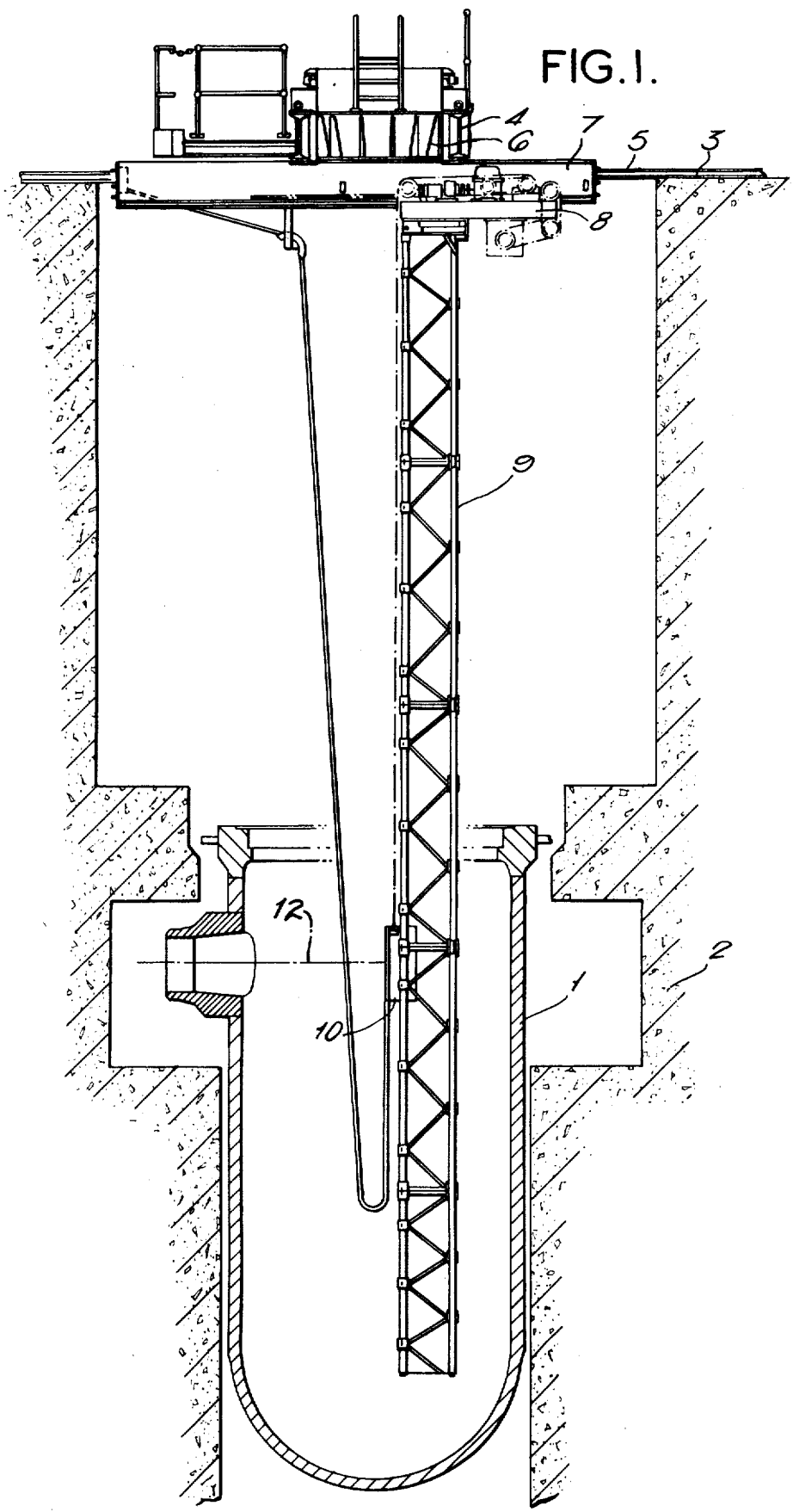
FIG. 1 is a diagrammatic view of the apparatus in position for inspecting a pressure vessel.

In FIG. 1 a reactor pressure vessel designated 1, (such as a vessel for a reactor known as a presurised water reactor) is shown located within a massive shielding structure 2 and the top face 3 of the structure provides an operating floor from which operations can be conducted on the reactor. The vessel is shown with the cover removed and the apparatus comprises a bridge 4 movable along rails 5 which span the opening of the vessel. The bridge has a slewing ring 6 (or turntable) located on it and the turntable carries a beam 7 which can be orientated in any direction in a plane parallel to the plane of the opening of the vessel by rotation of the slewing ring.

Figure 2:
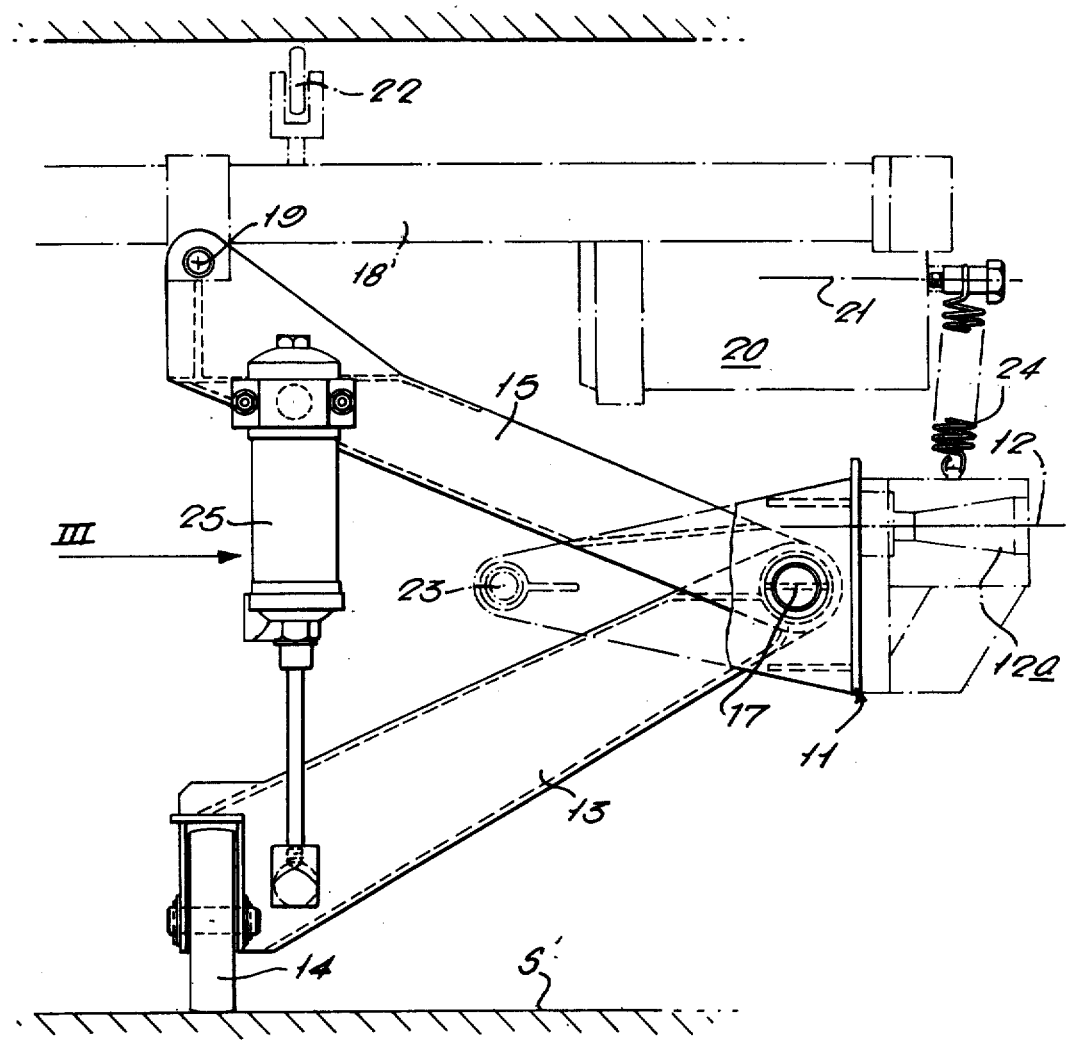
FIG. 2 is a side view of the manipulator.
Figure 3:
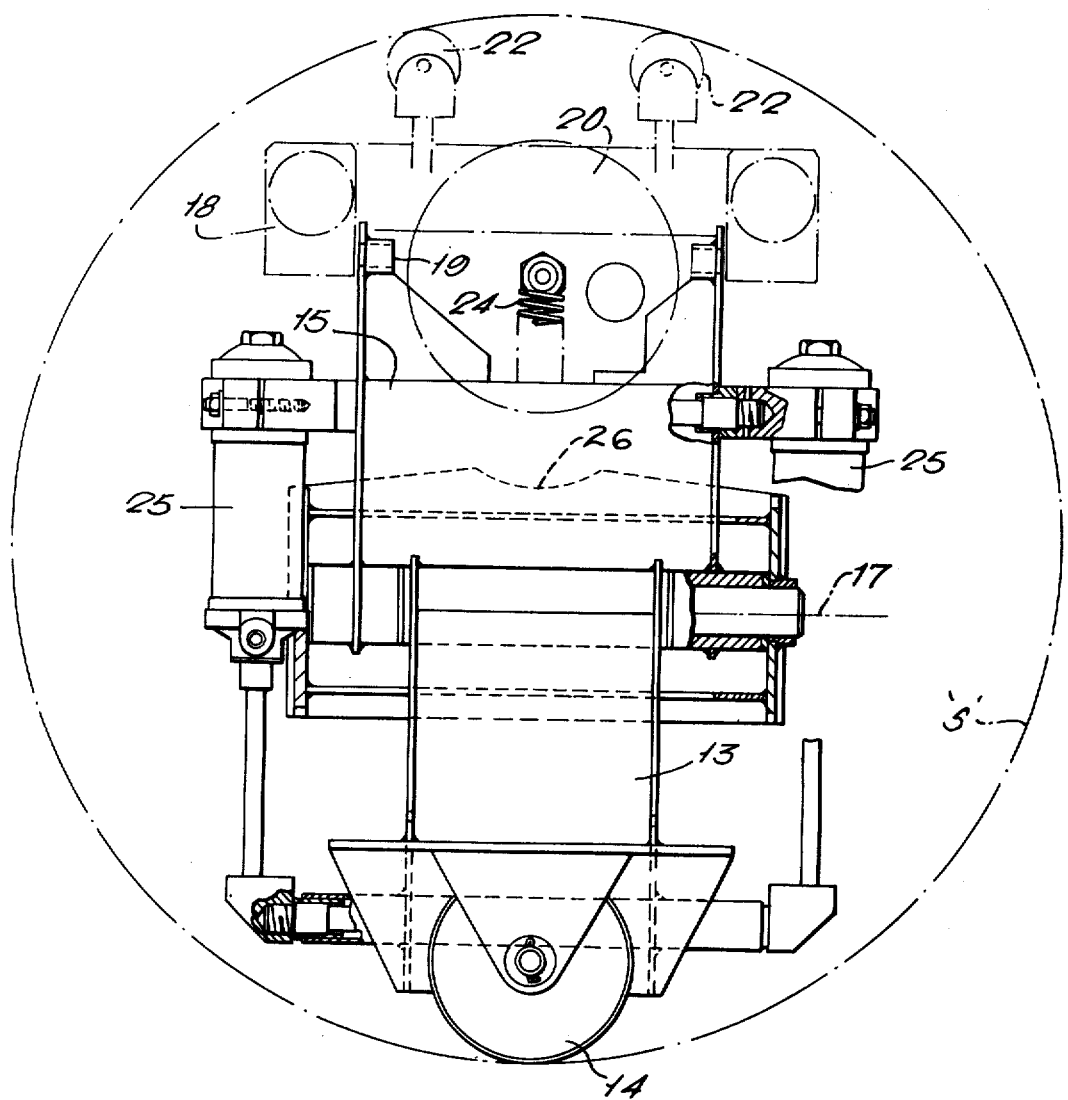
FIG. 3 is a fragmentary end view of the manipulator as seen in the direction of arrow III on FIG. 2.

A carriage 8 (hereinafter called the "mast carriage") is provided on the beam 7 and is movable linearly along the beam. Depending from the carriage there is a mast 9 extending downwardly into the pressure vessel. The mast also has a carriage 10 (hereinafter called the "manipulator carriage") movable linearly up and down the mast. The manipulator carriage 10 is adapted to support a mechanism selected from a range of mechanisms for carrying out ultrasonic scanning inspection operations but for the inspection of coolant nozzles the carriage 10 supports, pivotably about an axis 12, a manipulator in accordance with the invention. The manipulator is shown in FIGS. 2 and 3 and is designated 11. The mainpulator is carried such that the axis 12 extends normal to the mast. The manipulator can be entered into a nozzle of the vessel by performing four operations:

1. locate the axis of the slewing ring 6 on or approximately on the axis of the vessel by locating the bridge 4:

2. locate the beam 7 at the slewing ring 6 so that it extends in a direction parallel or approximately parallel to the axis of the nozzle:

3. move the manipulator carriage 10 on the mast 9 so that the axis of the manipulator is on, or approximately on, the axis of the nozzle; and 4. move the mast carriage 8 on the beam 7 so that the mast moves towards the nozzle to feed the manipulator into the nozzle.

Referring to FIGS. 2 and 3, manipulator 11 is basically of two-leg caliper form, the legs of the calipers being pivoted to one another about an axis 17 and being closed to allow the manipulator to enter a nozzle and opened (that is, radially expanded) to permit the manipulator to span the internal dimensions of the nozzle. The manipulator is rotatable about its principal axis 12 by a motor driven spindle 12a on the manipulator carriage.

One leg 13 of the manipulator 11 terminates at a wheel 14 for running around the interior surface 'S' of the nozzle and the other leg 15 of the manipulator 11 terminates in a gimbal mounting. A mounting for conventional ultrasonic scanning equipment (not shown) is shown generally in broken line and has a first pivoted part of a gimbal which comprises a generally rectangular frame 18 and pivots on the leg 15 about an axis 19 at right angles to the plane of the legs of the manipulator. A second pivoted part of the gimbal comprises a mounting 20 (shown generally in broken lines) for the transmit/receive head of the ultra-sonic scanning equipment and is pivoted about an axis 21 in the plane of the legs of the manipulator. The frame 18 is provided with four wheels 22, which are located at the corners of the frame, for running around the interior surface of the nozzle. The legs 13 and 15 have between them a pair of pneumatic rams 25 so that they can be contracted together or expanded apart. There is also provided an arrest bar 23 which serves to limit contraction of the legs. It is also provided that the second pivoted part of the gimbal is drawn towards a stop (see FIG. 3), such as by a tension spring 24, as the legs are contracted together. Thus the manipulator is compact and rigid when the legs are contracted so that it can be moved into a nozzle with a good clearance. As the legs are opened apart the parts of the manipulator have a high freedom of movement. When the legs are opened so that all wheels (four wheels 22 on the frame 18 and the wheel 14 on the leg 13 of the manipulator) contact the interior surface of the nozzle, the manipulator takes on a high degree of rigidity in any one position but is flexible to adapt to changed conditions as it is rotated without applying significant reactive loads to the mast or to the motor drive spindle for rotating the manipulator. In fact, the principal axis of the manipulator does not need to lie exactly on the axis of the nozzle. The manipulator axis can be slightly displaced and parallel to the nozzle axis or skewed relative to the nozzle axis without affecting the ability of the scanner mechanism to keep the scanning ultrasonic transmit/receive head accurately spaced from the interior surface of the nozzle as the manipulator is rotated and a scan takes place. Displacement of axis may cause some errors in interpreting the precise location of faults detected by the scanner but with modest displacements these errors may not be too significant and may be insignificant if the only problem is to identify the presence or absence of faults regardless of their location. The manipulator therefore accepts errors in its alignment in the nozzle and also accepts deviations from true cylindrical conditions in the nozzle as the manipulator is rotated.

We claim:

1. A manipulator for supporting an ultrasonic scanning transducer within a coolant nozzle of a nuclear reactor pressure vessel, the manipulator being arranged for carriage by a support member disposed within the vessel and comprising a caliper means including a pair of legs pivotable to span the bore of the nozzle, an ultrasonic transducer mounting attached to the free end of one leg of the pair of legs, and the pair of legs being pivotable about a manipulator axis extending between the legs and normal to the pivot axis of the legs, ram means connected to each leg for pivoting the legs together to enable free entry of the manipulator and ultrasonic transducer mounting into the nozzle and for pivoting the legs apart to span the bore of the nozzle, a plurality of roller members associated with the transducer mounting for making rolling contact with the interior surface of the nozzle and for spacing a transducer carried by the transducer mounting in an operable position relative to the surface of the nozzle, and a gimbal mount for mounting the transducer mounting on the free end of said one leg of the pair of legs.

2. A manipulator according to claim 1 further comprising spring means for urging the transducer mounting radially inwards towards a stop.

3. A manipulator according to claim 1 further comprising a further roller member mounted for rotation at the free end of the other leg of said pair of legs, the axis of rotation of said further roller member lying in the plane of said pair of legs.

* * * * *